United States Patent
Brown et al.

(10) Patent No.: US 9,147,182 B2
(45) Date of Patent: Sep. 29, 2015

(54) PRIORITIZING RESPONSES TO COMMUNICATIONS BASED ON USER'S EFFORTS IN CREATING COMMUNICATIONS

(75) Inventors: Kyle G. Brown, Apex, NC (US); Tendai P. Chinoda, Cranberry Township, PA (US); Tony J. Efremenko, Pittsburgh, PA (US); James E. Fox, Apex, NC (US); Emilio F. Zegarra, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 13/473,332

(22) Filed: May 16, 2012

(65) Prior Publication Data

US 2013/0311576 A1    Nov. 21, 2013

(51) Int. Cl.
*G06F 15/16*    (2006.01)
*G06Q 10/10*    (2012.01)
*H04L 12/58*    (2006.01)

(52) U.S. Cl.
CPC .............. *G06Q 10/107* (2013.01); *H04L 51/24* (2013.01); *H04L 51/32* (2013.01)

(58) Field of Classification Search
CPC ................................ H04L 51/04; H04L 51/26
USPC ........................................................ 709/206
See application file for complete search history.

(56) References Cited

U.S. PATENT DOCUMENTS

| | | |
|---|---|---|
| 2009/0234778 A1 | 9/2009 | Drucker et al. |
| 2011/0010182 A1 | 1/2011 | Turski et al. |
| 2011/0087743 A1* | 4/2011 | Deluca et al. ................. 709/206 |

FOREIGN PATENT DOCUMENTS

WO    2011062718    5/2011

OTHER PUBLICATIONS

"How Importance Ranking Works," http://mail.google.com/support/bin/answer.py?hl=en&answer=186543, Dec. 7, 2011.

* cited by examiner

*Primary Examiner* — Hua Fan
(74) *Attorney, Agent, or Firm* — Robert A Voigt, Jr.; Winstead, P.C.

(57) ABSTRACT

A method, system and computer program product for prioritizing responses to communications. Various metrics (e.g., the duration of time spent in creating the communication, the number of keystrokes used in creating the communication, the number of words used in creating the communication, the number of mistakes made and corrected in creating the communication, and the number of attachments to the communication) associated with creating a communication are recorded which are used to assess an effort provided by the author in creating the communication. A weighted priority to be associated with responses to the communication is determined based on these recorded metrics. The weighted priority is then assigned to responses to such a communication. In this manner, the responses to the created communication will be able to be prioritized based on the weighted priority thereby enabling the author to determine which responses are more important to read than other responses.

17 Claims, 3 Drawing Sheets

PRIORITIZING RESPONSES TO COMMUNICATIONS BASED ON USER'S EFFORTS IN CREATING COMMUNICATIONS

TECHNICAL FIELD

The present invention relates generally to communicating using computer-based technology, and more particularly to prioritizing responses to communications based on user's efforts in creating these communications.

BACKGROUND

There are various means of communicating among people using computer-based technology. For example, one such means of communicating using computer-based technology includes electronic mail, commonly called e-mail, which is a method of exchanging digital messages from an author to one or more recipients.

Another example of communicating using computer-based technology involves social networking. A social networking service is an online service, platform or site that focuses on building and reflecting of social networks or social relations among people (e.g., who share interests and/or activities). A social network service essentially consists of a representation of each user (often a profile), his/her social links and a variety of additional services. Most social network services are web based and provide means for users to interact over the Internet, such as by posting comments or status updates on the social network website.

In creating these communications (e.g., e-mails, posted comments on a social network website), the author may use a different amount of effort in creating these various communications. For example, the author may put a lot of effort (e.g., 30 minutes) in creating a particular e-mail communication to the Internal Revenue Service; whereas, the author may spend a few seconds with hardly any effort in posting a status update (e.g., currently having ice cream at the local ice cream shop) on a social network site. The author may deem responses to communications that required a lot of effort to construct as being more important to the author than responses to other communications that did not require as much effort from the author. However, there is not currently a means for prioritizing these responses based on the amount of effort the author used in constructing these communications. As a result, the author may receive a collection of responses to various communications that required various efforts in creating them but has no means of determining which responses are more important to the author than other responses.

BRIEF SUMMARY

In one embodiment of the present invention, a method for prioritizing responses to communications comprises recording metrics in creating a communication used to assess an effort provided by an author in creating the communication. The method further comprises determining a weighted priority to be associated with responses to the communication based on the recorded metrics. In addition, the method comprises assigning, by a processor, the weighted priority to a response to the communication.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for prioritizing responses to communications. In one embodiment, various metrics (e.g., the duration of time spent in creating the communication, the number of keystrokes used in creating the communication, the number of words used in creating the communication, the number of mistakes made and corrected in creating the communication, and the number of attachments to the communication) associated with creating a communication are recorded which are used to assess an effort provided by the author in creating the communication. A weighted priority to be associated with responses to the communication is determined based on these recorded metrics. The weighted priority is then assigned to responses to such a communication. In this manner, the responses to the created communication will be able to be prioritized based on the weighted priority thereby enabling the author to determine which responses are more important to read than other responses.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
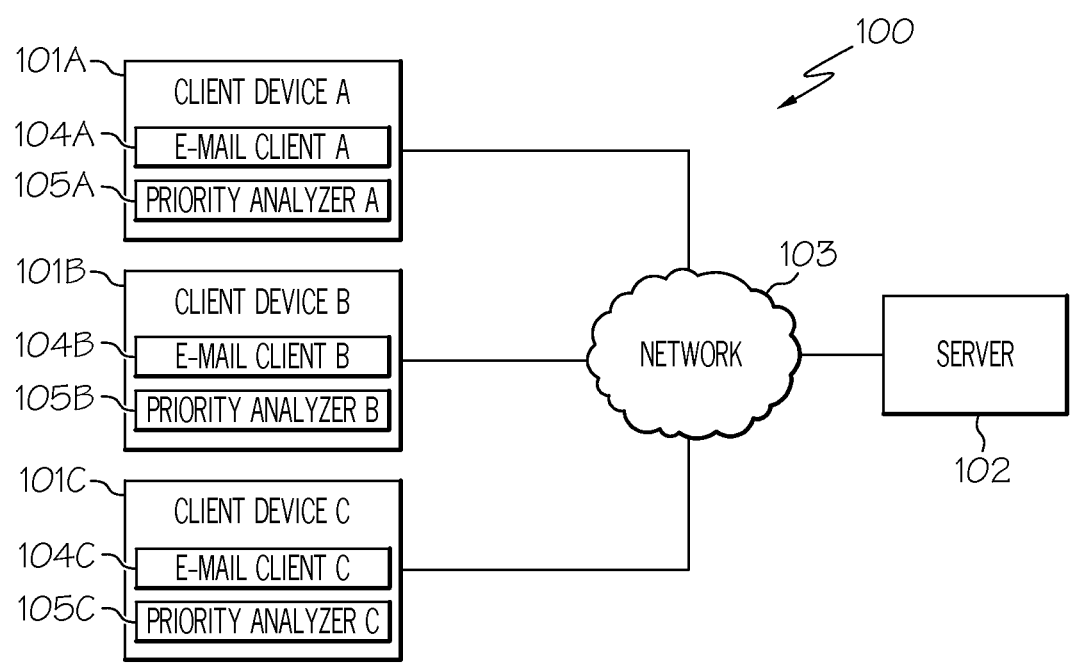
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server 102 via a network 103. Client devices 101A-101C may collectively or individually be referred to as clients 101 or client 101, respectively. Client 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with other clients 101 and server 102. Such communication includes, but not limited to, sending electronic mail messages and posting comments, replies, status updates, etc. on a social network website.

Each client 101 is configured to send and receive electronic mail messages as well as to post comments, replies, status updates, etc. on a social network website. Any user of client 101 may be the creator or initiator of an electronic mail message or a post on a social network website and any user of client 101 may be a recipient of an electronic mail message.

In one embodiment, each client 101A-101C may include a software agent, referred to herein as the e-mail client 104A-104C, respectively (identified as "E-mail Client A," "E-mail Client B," and "E-mail Client C," respectively, in FIG. 1). E-mail clients 104A-104C may collectively or individually be referred to as e-mail clients 104 or e-mail client 104, respectively. E-mail client 104 is configured to transfer electronic mail messages from one client 101 to another client 101. In one embodiment, each client 101A-101C may include a software agent, referred to herein as the priority analyzer 105A-105C, respectively (identified as "Priority Analyzer A," "Priority Analyzer B," and "Priority Analyzer C," respectively, in FIG. 1). Priority analyzers 105A-105C may collectively or individually be referred to as priority analyzers 105 or priority analyzer 105, respectively. Priority analyzer 105 is configured to prioritize responses to communications sent out by the user of client 101 as discussed in greater detail further below. A description of the hardware configuration of client 101 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In one embodiment, server 102 may represent a mail server that is configured to relay electronic mail messages sent between clients 101. Server 102 may also represent a social network server, which may be a web server configured to offer a social networking and/or microblogging service, enabling users of client devices 101 to send and read other users' posts on the social network website.

While FIG. 1 illustrates three clients 101A-101C and a single server 102, network system 100 may include any number of clients 101 and servers 102. For example, while server 102 may represent a single social network server, it is noted for clarity that multiple servers may be used to implement the social networking and/or microblogging service. The embodiments of network system 100 are not to be limited in scope to the depiction of FIG. 1.

Figure 2:
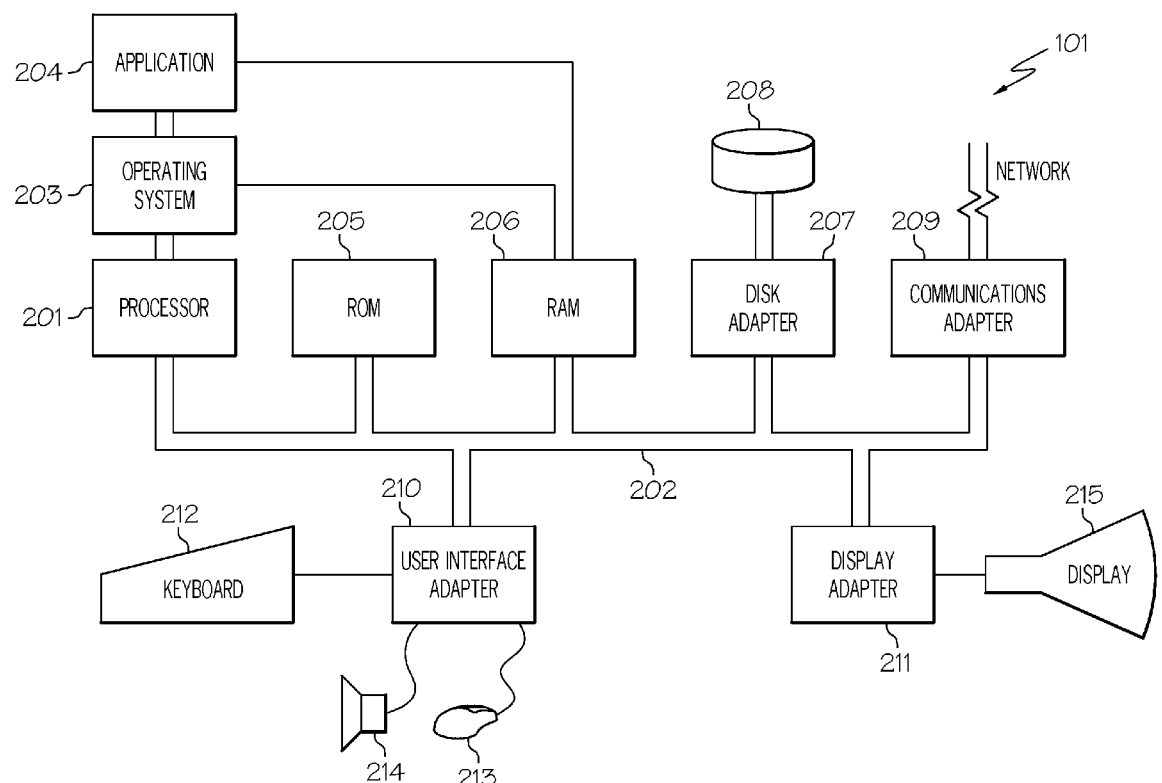
FIG. 2 illustrates a hardware configuration of a client device in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, e-mail client 104 (FIG. 1), priority analyzer 105 (FIG. 1) configured to prioritize responses to communications sent out by the user of client 101 as discussed further below in association with FIG. 3.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive. It is noted that the program for prioritizing responses to communications sent out by the user of client 101, as discussed further below in association with FIG. 3, may reside in disk unit 208 or in application 204.

Client 101 may further include a communications adapter 209 coupled to bus 202. Communications adapter 209 interconnects bus 202 with an outside network (network 103) thereby enabling client 101 to communicate with other clients 101 and server 102.

I/O devices may also be connected to client 101 via a user interface adapter 210 and a display adapter 211. Keyboard 212, mouse 213 and speaker 214 may all be interconnected to bus 202 through user interface adapter 210. Data may be inputted to client 101 through any of these devices. A display monitor 215 may be connected to system bus 202 by display adapter 211. In this manner, a user is capable of inputting to client 101 through keyboard 212 or mouse 213 and receiving output from client 101 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, in creating these communications (e.g., e-mails, posted comments on a social network website), the author may use a different amount of effort in creating these various communications. For example, the author may put a lot of effort (e.g., 30 minutes) in creating a particular e-mail communication to the Internal Revenue Service; whereas, the author may spend a few seconds with hardly any effort in posting a status update (e.g., currently having ice cream at the local ice cream shop) on a social network site. The author may deem responses to communications that required a lot of effort to construct as being more important to the author than responses to other communications that did not require as much effort from the author. However, there is not currently a means for prioritizing these responses based on the amount of effort the author used in constructing these communications. As a result, the author may receive a collection of responses to various communications that required various efforts in creating them but has no means of determining which responses are more important to the author than other responses.

The principles of the present invention provide a means for prioritizing responses to communications based on the amount of effort used by the author in constructing these communications as discussed further below in connection with FIG. 3.

Figure 3:
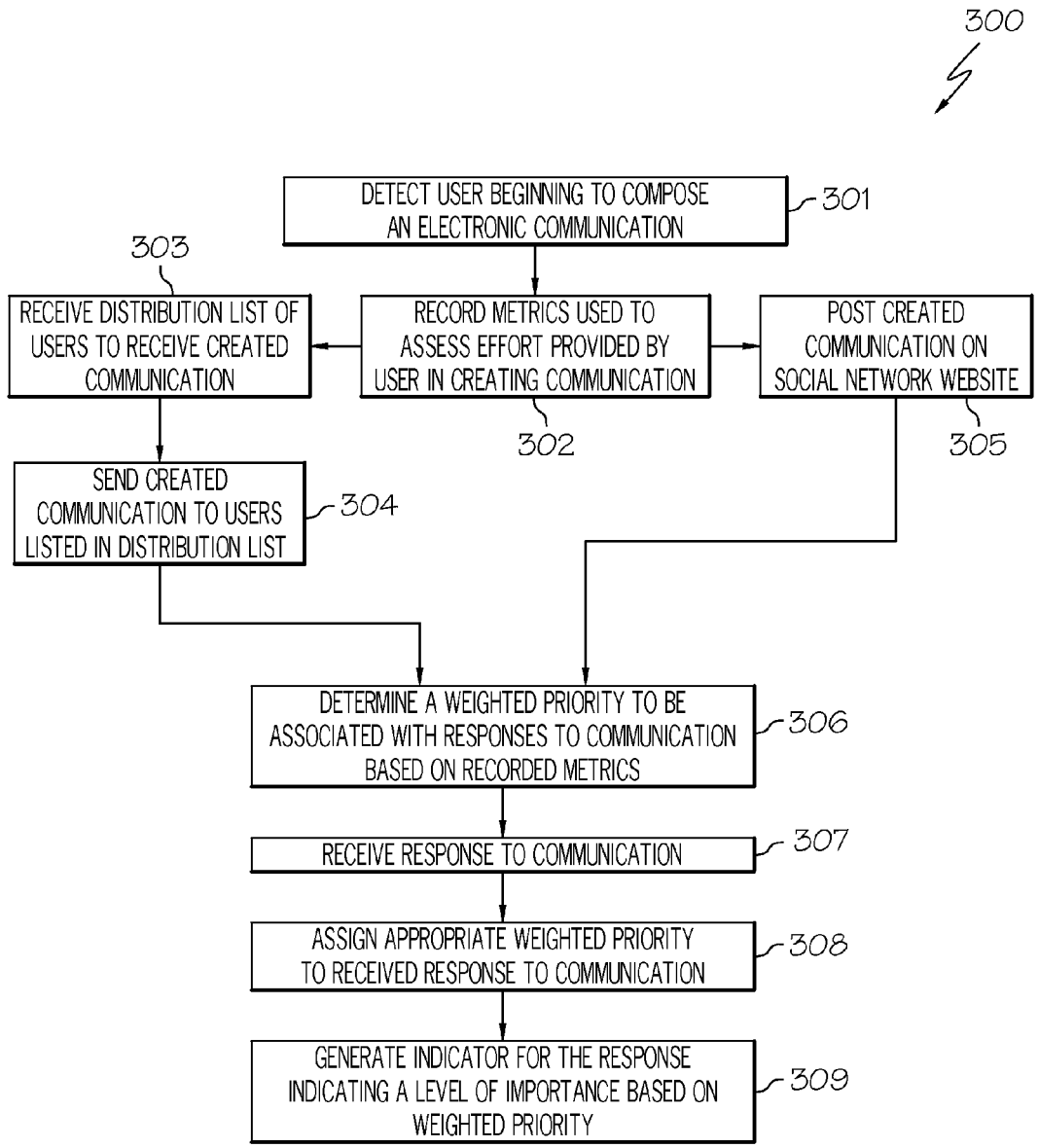
FIG. 3 is a flowchart of a method for prioritizing responses to communications based on the author's efforts in constructing these communications in accordance with an embodiment of the present invention.

FIG. 3 is a flowchart of a method 300 for prioritizing responses to communications based on the author's efforts in constructing these communications in accordance with an embodiment of the present invention.

Referring to FIG. 3, in conjunction with FIGS. 1-2, in step 301, priority analyzer 105 detects the user of client 101 beginning to compose an electronic communication. For example, the user of client 101A may begin to compose an electronic mail message.

In step 302, priority analyzer 105 records various metrics used to assess the effort provided by the user in creating the communication. Exemplary metrics include, but not limited to, the duration of time spent in creating the communication, the number of keystrokes used in creating the communication, the number of words used in creating the communication, the number of mistakes made and corrected in creating the communication, and the number of attachments to the communication, such as pictures, slides, word processing documents, etc. These metrics may be recorded by priority analyzer 105 by interfacing with various mechanisms of client 101. For example, the duration of time may be determined by a clocking mechanism in client 101 configured in either software or hardware or a combination of software and hardware, where priority analyzer 105 records the duration of time by interfacing with such a clocking mechanism. In another example, priority analyzer 105 may record the number of keystrokes used in creating the communication via an interface with an input mechanism, such as keyboard 212. In another example, priority analyzer 105 may record the number of words used in creating the communication via an interface with an input mechanism, such as a word processing tool. In another example, the mistakes made and corrected may be identified by the user selecting the delete key, backspace key or performing cutting/pasting actions, where such actions may be recorded by priority analyzer 105 interfacing with an input mechanism, such as keyboard 212. In a further example, the number of attachments used by the author may be recorded by priority analyzer 105 interfacing with an input mechanism, such as e-mail client 104.

The principles of the present invention are not to be limited in scope to the metrics listed above and include any other metric that may be used in assessing the effort provided by the user in creating the communication. In one embodiment, these metrics are recorded and used to assess the effort provided by the user in creating the communication from the point in time when the author initiates the creation of the communication until the author has completed the communication, which is indicated by the author sending/posting the communication.

As discussed above, various means of communication using computer-based technology may be implemented. For example, electronic mail may be used to communicate among other users of clients 101 as discussed below in steps 303-304.

In step 303, e-mail client 104 receives a distribution list of users (e.g., user of client 101B, user of client 101C) to receive the communication being created by the user of client 101 (e.g., user of client 101A). In step 304, e-mail client 104 sends the created communication to the users listed in the distribution list via e-mail server 102. For example, the user of client 101A may have constructed an electronic mail message to be sent to the users of clients 101B, 101C. The electronic mail message may be sent to e-mail server 102, which then relays the electronic mail message to the e-mail clients 104 of the users of clients 101B, 101C.

Alternatively to communicating by electronic mail, the user may post the communication on a social network website. Alternatively to step 303, the user of client 101, in step 305, posts the created communication on a social network website, such as posting the communication on a social network website maintained by social network server 102.

Upon sending/posting the created communication, in step 306, priority analyzer 105 determines the weighted priority to be associated with the responses to the created communication based on the recorded metrics. In this manner, the responses to the created communication will be able to be prioritized thereby enabling the author to determine which responses are more important to read than other responses. For example, a formula for assigning the priority weight may be the following (Equation EQ 1):

$$PriorityWeight = ExistingPriorityWeight * (0.0005*timeSpent) + (0.0015*correctionsMade) + (0.0005*totalWords) + (0.010*attachments) \quad (EQ1)$$

where PriorityWeight refers to the weighted priority assigned to the responses of the communication; ExistingPriorityWeight is a configurable parameter (e.g., existing weight of 80) used to establish a basis for a weighted response; timeSpent refers to the duration of time spent in creating the communication; correctionsMade refers to the number of corrections made in creating the communication; totalWords refer to the number of words used in creating the communication; and attachments refer to the number of attachments to the created communication. For example, suppose that a communication, such as an e-mail, was created with 45 corrections made, 2000 characters and 10 embedded images and took 900 seconds (15 minutes) to complete. The priority weight assigned to responses to such a communication where the ExistingPriorityWeight parameter is 80 would be 122.2(80*(0.0005*900)+(0.0015*45)+(0.0005*2000)+ (0.0010*10)). In another example, suppose that the communication was created with 2 corrections made, 2000 characters and 1 embedded image and took 60 seconds to complete. The priority weight assigned to responses to such a communication where the ExistingPriorityWeight parameter is 80 would be 82.72(80*(0.0005*60)+(0.0015*2)+(0.0005* 2000)+(0.0010*1)). In comparing these two examples, responses to the first communication with a priority weight of 122.2 would be assigned a higher priority or importance than responses to the second communication with a priority weight of 82.72.

In one embodiment, the formula used to derive a weighted priority to be associated with responses to a communication based on the recorded metrics may be provided by the composer. In this manner, the composer may specifically assign weighted importance to the metrics to provide a result that more accurately reflects responses that would be of greater importance to the composer. For instance, the composer may assign a greater weight to the number of words used in the communication than in the above illustrative formula. For example, instead of using the weight of 0.0005 in Equation EQ1, a greater weight, such as 0.002, may be used.

It is noted that the formula of Equation EQ1 that was used to derive a weighted priority to be associated with responses to a communication based on the recorded metrics is exemplary and the principles of the present invention are not to be limited in scope to the use of such a formula.

In step 307, client 101 receives a response to the communication. For example, the user of client 101 receives a response to the electronic mail message that was sent to the other users of client 101. In another example, the user of client 101 receives a response to the communication posted on a social network website.

In step 308, priority analyzer 105 assigns the weighted priority (determined step 306) to the response to the communication. The higher the weighted priority assigned to the response, the greater the importance of the response may be to the user. Based on the weighted priority, priority analyzer 105, in step 309, generates an indicator for the response indicating a level of importance. For instance, referring to the above example, priority analyzer 105 may provide an indication of "high priority" for the response assigned the weighted priority of 122.2; whereas, priority analyzer 105 may provide an indication of "regular priority" for the response assigned the weighted priority of 82.72. In this manner, the author will be able to determine which responses are more important to read than other responses.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for prioritizing responses to communications, the method comprising:

recording metrics III creating a communication used to assess an effort provided by an author in creating said communication from a point in time when said author initiates creation of said communication until said author has completed said communication;

determining a weighted priority to be associated with responses to said communication based on said recorded metrics thereby enabling said author to determine which responses are more important to read than other responses, wherein said weighted priority comprises a combination of weighted importance to each of said metrics; and assigning, by a hardware processor, said weighted priority to a response to said communication, wherein said metrics comprise two or more of the following: a duration of time spent in creating said communication, a number of keystrokes used in creating said communication, a number of words used in creating said communication, a number of mistakes detected in creating said communication, and a number of attachments to said communication.

2. The method as recited in claim 1 further comprising:
generating an indicator for said response indicating a level of importance based on said weighted priority.

3. The method as recited in claim 1 further comprising:
receiving a distribution list of users to receive said communication; and
sending said communication to said users listed in said distribution list.

4. The method as recited in claim 1 further comprising:
posting said communication on a social network website.

5. The method as recited in claim 1, wherein said communication is an electronic mail message.

6. The method as recited in claim 1, wherein said communication is a post to a social network website.

7. A computer program product embodied in a non-transitory computer readable storage medium for prioritizing responses to communications, the computer program product comprising the programming instructions for:
recording metrics m creating a communication used to assess an effort provided by an author in creating said communication from a point in time when said author initiates creation of said communication until said author has completed said communication;
determining a weighted priority to be associated with responses to said communication based on said recorded metrics thereby enabling said author to determine which responses are more important to read than other responses, wherein said weighted priority comprises a combination of weighted importance to each of said metrics; and
assigning said weighted priority to a response to said communication,
wherein said metrics comprise two or more of the following: a duration of time spent in creating said communication, a number of keystrokes used in creating said communication, a number of words used in creating said communication, a number of mistakes detected in creating said communication, and a number of attachments to said communication.

8. The computer program product as recited in claim 7 further comprising the programming instructions for:
generating an indicator for said response indicating a level of importance based on said weighted priority.

9. The computer program product as recited in claim 7 further comprising the programming instructions for:
receiving a distribution list of users to receive said communication; and
sending said communication to said users listed in said distribution list.

10. The computer program product as recited in claim 7 further comprising the programming instructions for:
posting said communication on a social network website.

11. The computer program product as recited in claim 7, wherein said communication is an electronic mail message.

12. The computer program product as recited in claim 7, wherein said communication is a post to a social network website.

13. A system, comprising:
a memory unit for storing a computer program for prioritizing responses to communications; and
a processor coupled to said memory unit, wherein said processor, responsive to said computer program, comprises:
circuitry for recording metrics in creating a communication used to assess an effort provided by an author in creating said communication from a point in time when said author initiates creation of said communication until said author has completed said communication;
circuitry for determining a weighted priority to be associated with responses to said communication based on said recorded metrics thereby enabling said author to determine which responses are more important to read than other responses, wherein said weighted priority compnses a combination of weighted importance to each of said metrics; and
circuitry for assigning said weighted priority to a response to said communication,
wherein said metrics comprise two or more of the following: a duration of time spent in creating said communication, a number of keystrokes used in creating said communication, a number of words used in creating said communication, a number of mistakes detected in creating said communication, and a number of attachments to said communication.

14. The system as recited in claim 13, wherein said processor further comprises:
circuitry for generating an indicator for said response indicating a level of importance based on said weighted priority.

15. The system as recited in claim 13, wherein said processor further comprises:
circuitry for receiving a distribution list of users to receive said communication; and
circuitry for sending said communication to said users listed in said distribution list.

16. The system as recited in claim 13, wherein said processor further comprises:
circuitry for posting said communication on a social network website.

17. The system as recited in claim 13, wherein said communication is an electronic mail message.

* * * * *